(12) United States Patent
Ichihashi

(10) Patent No.: US 10,444,531 B2
(45) Date of Patent: Oct. 15, 2019

(54) LENS DRIVE DEVICE HAVING POSITION SENSOR AND CIRCUIT BOARD

(71) Applicant: TDK CORPORATION, Tokyo (JP)

(72) Inventor: Shusuke Ichihashi, Tokyo (JP)

(73) Assignee: TDK CORPORATION, Tokyo (JP)

( * ) Notice: Subject to any disclaimer, the term of this patent is extended or adjusted under 35 U.S.C. 154(b) by 102 days.

(21) Appl. No.: 15/799,166

(22) Filed: Oct. 31, 2017

(65) Prior Publication Data

US 2018/0129064 A1    May 10, 2018

(30) Foreign Application Priority Data

Nov. 4, 2016  (JP) ................. 2016-216500

(51) Int. Cl.
*G02B 27/64* (2006.01)
*G02B 13/00* (2006.01)
*G03B 5/04* (2006.01)

(52) U.S. Cl.
CPC ......... *G02B 27/646* (2013.01); *G02B 13/001* (2013.01); *G03B 5/04* (2013.01); *G03B 2205/0015* (2013.01); *G03B 2205/0069* (2013.01)

(58) Field of Classification Search
CPC ........ G02B 7/04; G02B 27/64; G02B 27/646; H04N 5/23248; H04N 5/23264; H04N 5/2328; H04N 5/23287

USPC ....... 359/554, 557; 250/201.1, 201.2, 201.4; 348/208.99, 208.2, 208.12; 396/52, 55
See application file for complete search history.

(56) References Cited

U.S. PATENT DOCUMENTS

| | | | |
|---|---|---|---|
| 9,989,726 B2 * | 6/2018 | Huang | G03B 3/10 |
| 10,095,047 B2 * | 10/2018 | Min | G02B 7/08 |
| 2013/0016427 A1 | 1/2013 | Sugawara | |
| 2015/0226978 A1 | 8/2015 | Sugawara | |
| 2017/0031174 A1 | 2/2017 | Sugawara | |

FOREIGN PATENT DOCUMENTS

JP        2013-24938 A    2/2013

* cited by examiner

*Primary Examiner* — Arnel C Lavarias
(74) *Attorney, Agent, or Firm* — Oliff PLC

(57) ABSTRACT

A lens drive device includes a movable portion, a fixed portion, and four suspension wires. The movable portion has a lens holder holding a lens and a magnet arranged at a position that does not overlap with the lens when viewed from a light axis direction. The fixed portion has a coil and a position sensor arranged to oppose against the magnet in the light axis direction and a circuit board having multiple wirings. The wires are arranged around the lens at approximately equal intervals in the light axis direction. The sensor and the coil are arranged to overlap with four sides of a four-sided polygon formed by connecting four wire connection positions where the wires are connected with the fixed portion. The sensor is arranged between the wire connection position closest to the sensor and the coil closest thereto.

6 Claims, 10 Drawing Sheets

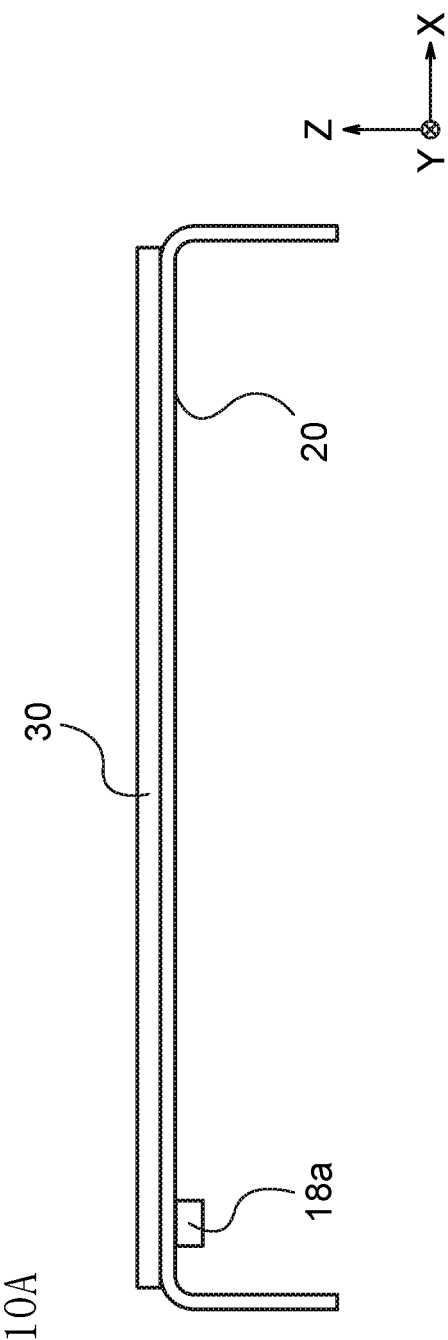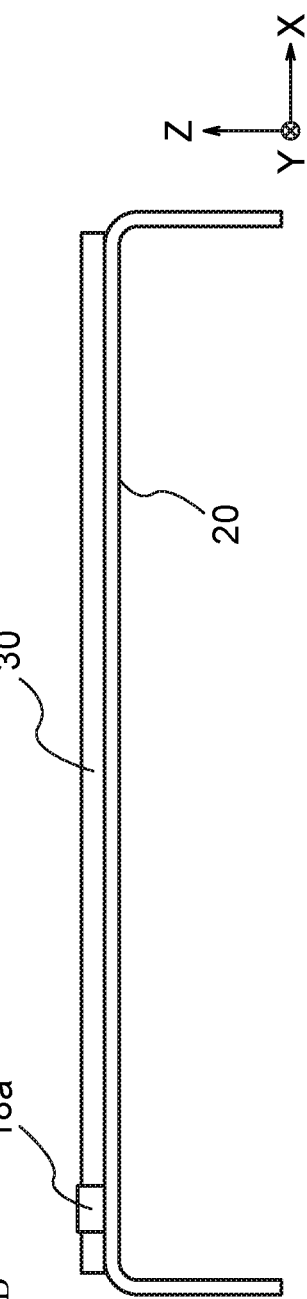
FIG. 10A
FIG. 10B

LENS DRIVE DEVICE HAVING POSITION SENSOR AND CIRCUIT BOARD

BACKGROUND OF THE INVENTION

1. Field of the Invention

The present invention relates to a lens drive device favorably used for a camera module of mobile phones, for example.

2. Description of the Related Art

In lens drive devices favorably used for a camera module or so of mobile phones, developments are underway with respect to a device for carrying out a blur correction by moving a blur correction movable portion with a lens holder holding a lens to vertical directions to a light axis (e.g., Patent Document 1 below).

The movement of the blur correction movable portion is controlled by a drive means for relatively moving the blur correction movable portion to a fixed portion, a position sensor that detects a position of the blur correction movable portion, and the like. A coil, a magnet, the position sensor, and the like constituting the drive means are arranged at a position that does not overlap with the lens when viewed from a light axis direction so as not to shield a light going through the lens.

In conventional lens drive devices, as an arrangement of a coil and a position sensor, a technique for dividing a coil arranged in any of sides of a fixed portion into two portions and arranging a hole element as a position sensor on a middle part of the side. In such an arrangement, the hole element can detect a magnetic force by a magnet constituting the drive means and can detect a position of the blur correction movable portion, and the magnet of the drive means can thereby also function as a magnetic force generation means for position detection.

Patent Document 1: JP 2013-24938A

SUMMARY OF THE INVENTION

However, when attempting to achieve further downsizing of the lens drive device, when attempting to achieve a larger diameter of a lens to be mounted while maintaining an outer diameter size of the lens drive device, or the like, spaces of middle parts of sides are small, and it becomes hard to maintain an arrangement region of the position sensor containing a wiring space therefor. Even when the position sensor is arranged in a limited region, it is necessary to favorably maintain a position detection accuracy of the position sensor.

The present invention has been achieved under such circumstances. It is an object of the invention to provide a lens drive device capable of reducing its size and precisely controlling a position of a lens.

To achieve the above object, the lens drive device according to the present invention is a lens drive device comprising:

a movable portion having a lens holder holding a lens and a magnet arranged at a position that does not overlap with the lens when viewed from a light axis direction;

a fixed portion having a coil and a position sensor arranged to oppose against the magnet in the light axis direction and a circuit board having a plurality of wirings configured to supply electricity to the coil and the position sensor and transmit a signal from the position sensor; and four suspension wires arranged around the lens at approximately equal intervals when viewed from the light axis direction and configured to support the movable portion against the fixed portion so that the movable portion can move relatively to the fixed portion in a vertical direction to the light axis direction by an electromagnetic force generated in the magnet and the coil, wherein the position sensor and the coil are arranged to overlap with four sides of a four-sided polygon formed by connecting four wire connection positions where the four suspension wires are connected with the fixed portion when viewed from the light axis direction, and the position sensor is arranged between the wire connection position closest to the position sensor and the coil closest to the position sensor.

In the lens drive device according to the present invention, since the position sensor is not arranged between divided coils but is arranged between the wire connection position and the coil, the coil on the side equipped with the position sensor does not need to be divided, and the coil, which generates a favorable drive force, can be arranged even in a small region. In addition, the position sensor is not arranged at a middle position of a side having a small width in the diameter direction but can be arranged near the wire connection position, which has a large width in the diameter direction, and the lens drive device according to the present invention is thus advantageous in terms of increase in a diameter of the lens and downsizing of the entire device. In addition, since the position sensor is arranged to overlap with the four sides of the four-sided polygon formed by connecting the wire connection positions, it is possible to prevent increase in position detection errors due to inclination of the movable portion and precisely control a position of the lens. Such an arrangement can downsize the magnet provided in the movable portion and is advantageous in terms of downsizing in this aspect as well.

For example, the circuit board may comprise:

a coil leading terminal portion provided with a plurality of leading terminals along one of the four sides of the four-sided polygon formed by connecting the wire connection positions and electrically connected with a coil wiring of the plurality of wirings for supplying electricity to the coil; and a sensor leading terminal portion provided with a plurality of leading terminals along another one of the four sides of the four-sided polygon formed by connecting the wire connection positions and electrically connected with a sensor wiring of the plurality of wirings for supplying electricity to the position sensor and transmitting a signal therefrom.

In such a circuit board, the coil leading terminal portion and the sensor leading terminal portion are arranged on sides differing from each other of the fixed portion, and it is thus possible to prevent a signal of the position sensor transmitted via the sensor wiring from containing noise due to change in electric current of the coil wiring. In the lens drive device having such a circuit board, a position of the lens can be controlled precisely by reducing the noise contained in the signal of the position sensor.

For example, the circuit board may comprise:

a board plane portion extending along the vertical direction to the light axis direction; and a board folded portion connected with the board plane portion at a position that is more distant from a center position of the light axis direction than the four sides of the four-sided polygon formed by connecting the wire connection positions and extending along the light axis direction, the position sensor is fixed to the board plane portion, and the sensor leading terminal portion is arranged on the board folded portion.

Since the circuit board has the board folded portion, it is possible to reduce a projected area from the light axis direction, and such a lens drive deice is advantageous in terms of downsizing. Since the position detection sensor is fixed to the board plane portion, the position detection sensor can be easily opposed to the magnet, and a position of the lens can be detected precisely.

For example, the circuit board may be a flexible print board, and a notch may be formed on both ends of a connection portion with the board folded portion in an outer circumferential portion of the board plane portion.

Since the notches are formed, it is possible to prevent a stress due to folding the flexible print board from traveling to a vicinity of the connection portion between the board plane portion and the board folded portion or prevent the stress from remaining, and is possible to enhance a detection accuracy of the position sensor fixed to the board plane portion.

For example, the sensor leading terminal portion may comprise:

a pair of feeding leading terminals configured to supply electricity to the position sensor; and a signal transmission leading terminal arranged to be sandwiched by the pair of feeding leading terminals and configured to transmit a signal of the position sensor.

Such a structure can prevent the noise contained in the signal of the position sensor from increasing due to influence of an electromagnetic field in the vicinity. Thus, the lens drive device having such a circuit board can precisely control a position of the lens by reducing the noise contained in the signal of the position sensor.

BRIEF DESCRIPTION OF THE DRAWINGS

FIG. 10A and FIG. 10B are a schematic view showing an arrangement relation between a circuit board and positional sensors in an embodiment and a variation.

DESCRIPTION OF THE PREFERRED EMBODIMENTS

Hereinafter, the present invention is described based on an embodiment shown in the figures.

Figure 1:
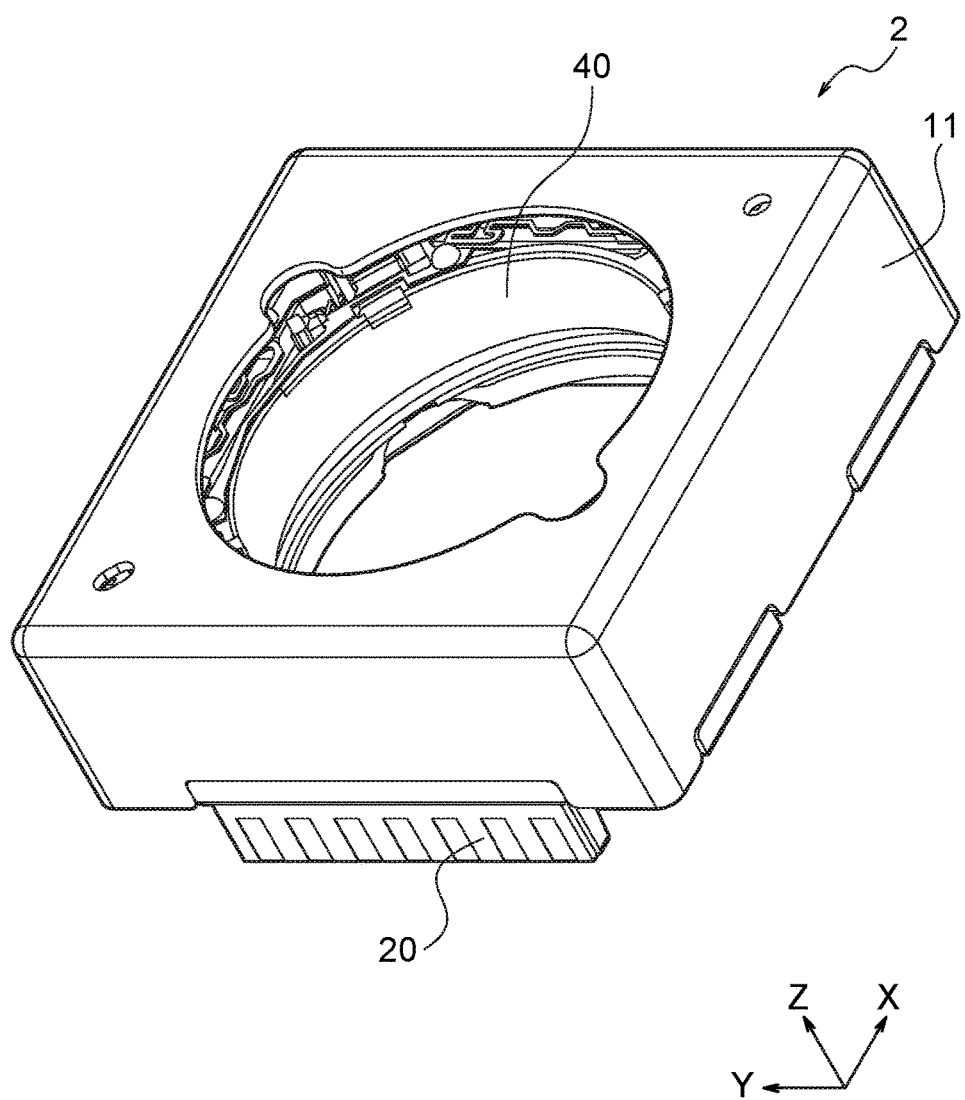
FIG. 1 is a whole perspective view of a lens drive device according to an embodiment of the present invention.

As shown in FIG. 1, a lens drive device 2 according to an embodiment of the present invention has an approximately rectangular parallelepiped outer shape, and a case 11 attached from the positive side of the Z-axis direction constitutes an outer surface of side surfaces and a top surface. A central area of the case 11 is provided with an opening that guides a light into the case 11, and the light passing through the opening of the case 11 enters a lens 100 (see FIG. 6) held by a lens holder 40 inside the case 11. A part of a circuit board 20 is exposed on the lower side of side surfaces of the lens drive device 2.

Figure 2:
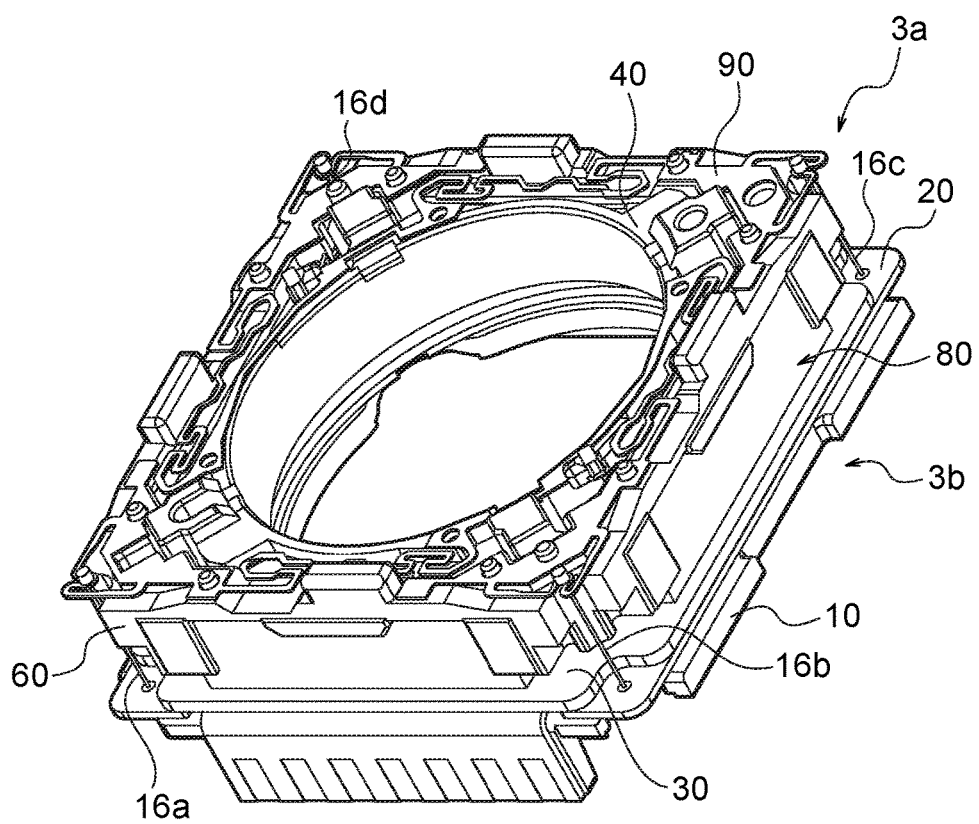
FIG. 2 is a whole perspective view showing the inside of the lens drive device with no case shown in FIG. 1.
Figure 3:
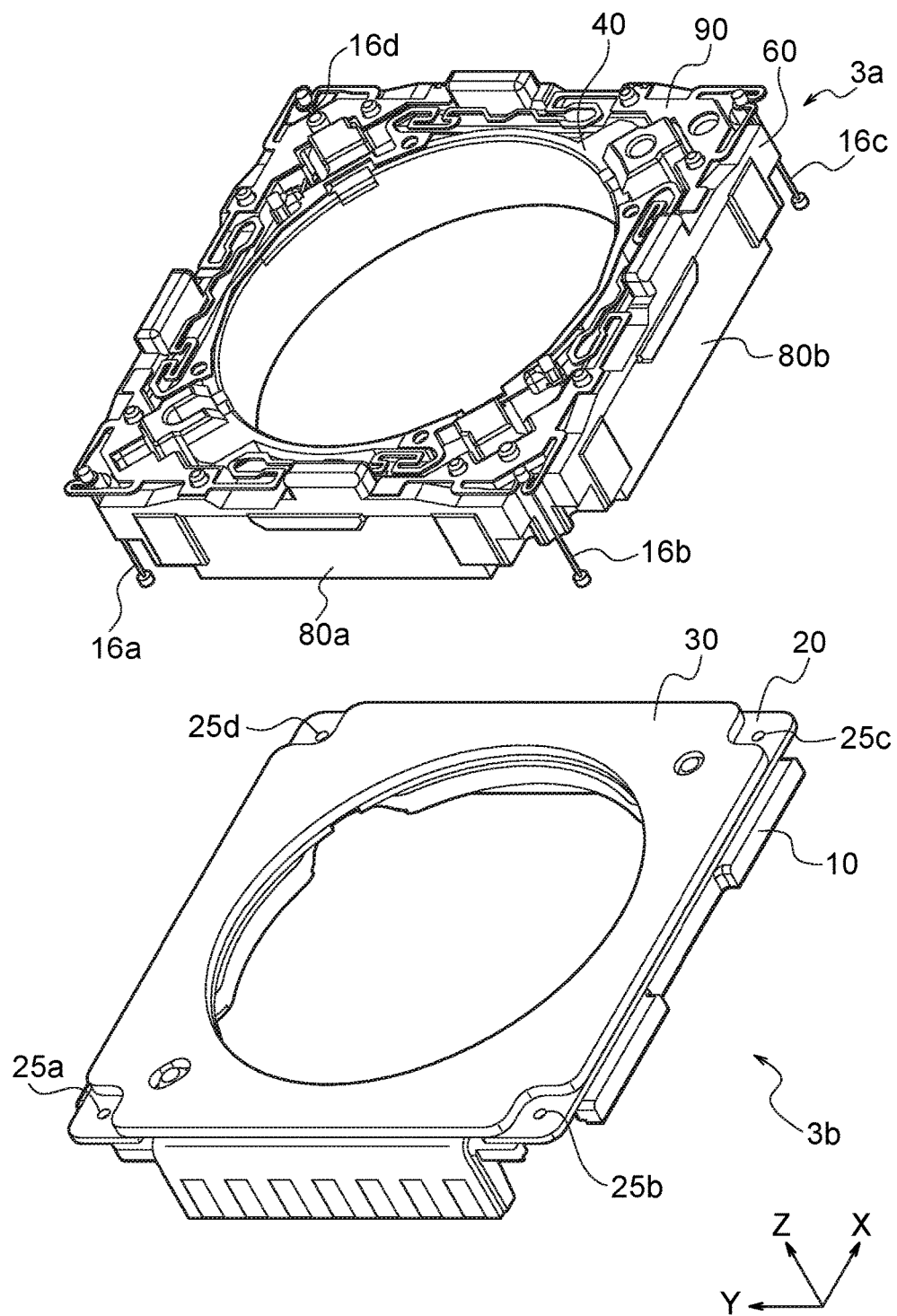
FIG. 3 is a partially disassembled perspective view showing disassembled movable portion and fixed portion of the lens drive device with no case shown in FIG. 2.

FIG. 2 is a whole perspective view showing the inside of the lens drive device 2 without the case 11 shown in FIG. 1. As shown in FIG. 2, the case 11 contains a movable portion 3a and a fixed portion 3b. As shown in FIG. 3, which shows that the movable portion 3a and the fixed portion 3b are disassembled, the lens drive device 2 has four suspension wires 16a, 16b, 16c, and 16d. The four suspension wires 16a, 16b, 16c, and 16d support the movable portion 3a with respect to the fixed portion 3b. Incidentally, the case 11 is fixed to a base 10 of the fixed portion 3b.

Figure 4:
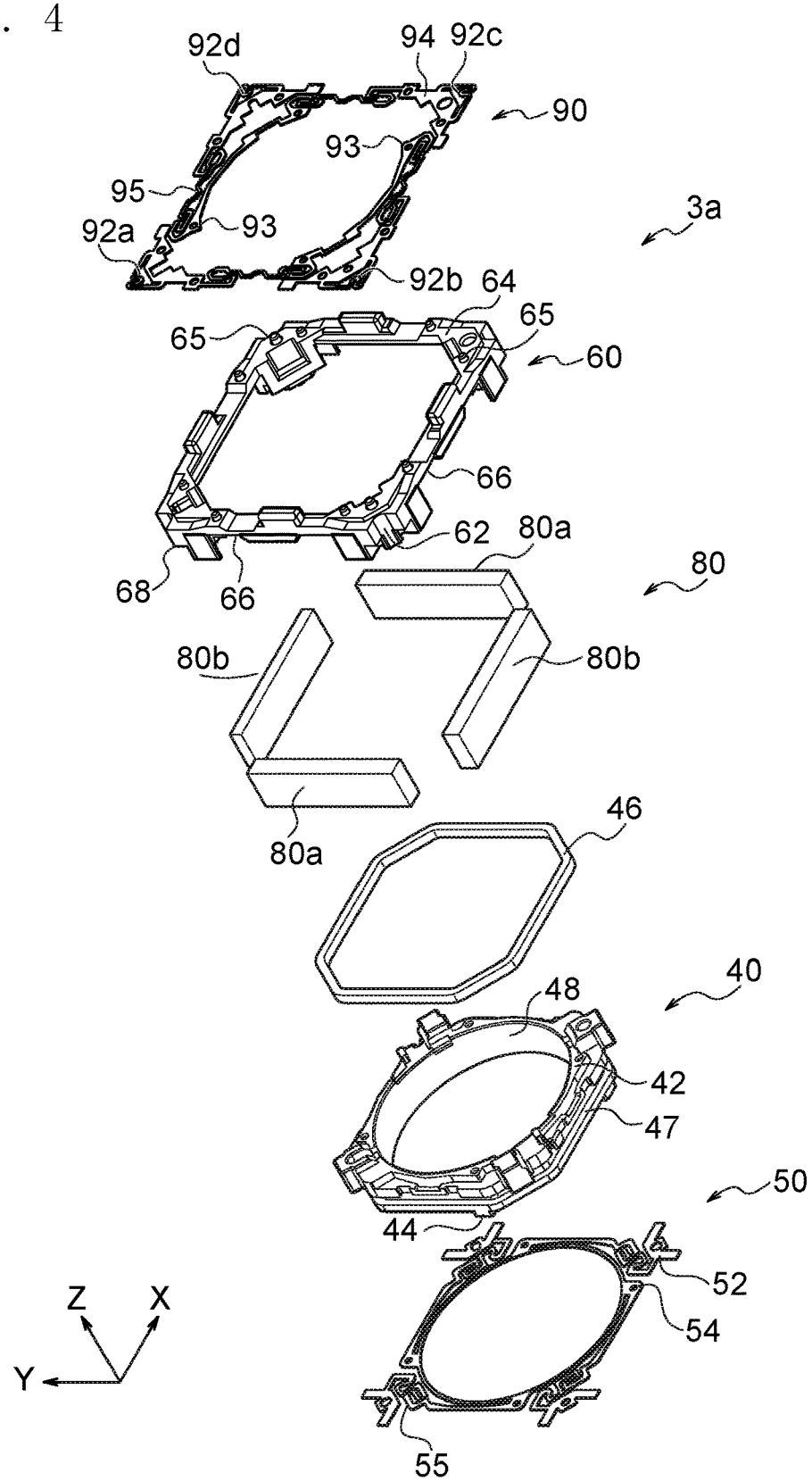
FIG. 4 is a disassembled perspective view of parts constituting the movable portion shown in FIG. 3.

FIG. 4 is a disassembled perspective view of the movable portion 3a shown in FIG. 3. The movable portion 3a has a lens holder 40 and a two-way magnet 80. The lens holder 40 holds the lens 100 (see FIG. 6). The two-way magnet 80 is arranged at a position that does not overlap with the lens 100 when viewed from a light axis direction (see FIG. 8). In addition to the lens holder 40 and the two-way magnet 80, the movable portion 3a has a front spring 90, a frame 60, a focus coil 46, and a rear spring 50.

Incidentally, the lens drive device 2 is described with a Z-axis, an X-axis, and a Y-axis. The Z-axis is a parallel direction to a light axis of the lens 100. The X-axis and the Y-axis are a vertical direction to the light axis. The X-axis, the Y-axis, and the Z-axis are vertical to each other. The X-axis corresponds with a first drive axis of blur correction, and the Y-axis corresponds with a second drive axis of blur correction. A front surface or a front side along the Z-axis represents an upward direction and represents an object side to the lens 100 in FIG. 6. A back surface or a back side along the Z-axis represents a downward direction and represents an imaging element side to the lens 100 in FIG. 6.

The lens holder 40 shown in FIG. 4 has an inner circumferential surface 48 having a circular shape when viewed from the light axis. An outer circumferential surface of the lens 100 not shown in FIG. 4 is attached to the inner circumferential surface 48 of the lens holder 40. As shown in FIG. 2 and FIG. 3, an outer circumferential surface 47 of the lens holder 40 has a polygonal outer circumferential shape contained inside the frame 60, and the focus coil 46 is attached to an outer circumferential groove formed on the outer circumferential surface 47 of the lens holder 40.

The lens holder 40 is attached to the frame 60 via the front spring 90 and the rear spring 50. The lens 100 and the focus coil 46 fixed to the lens holder 40 are movable relatively to the frame 60 in the light axis direction.

As shown in FIG. 4, the front spring 90 consists of a plurality of board-shaped divided plate springs that are mutually separated and insulated (two board-shaped divided plate springs in the present embodiment). The front spring 90 has wire attachment portions 92a to 92d where front tips of the suspension wires 16a to 16d are attached. The four wire attachment portions 92a to 92d are arranged at four corners of the front spring 90.

Holder attachment portions 93 of the front spring 90 are attached and fixed to a front surface 42 of the lens holder 40. The front spring 90 has four frame attachment portions 94 corresponding and connected with each of the wire attachment portions 92a arranged at the four corners. The frame attachment portions 94 are attached and fixed to four corners positioned on a front surface 64 of the frame 60 having a rectangular ring shape.

The front surface 64 positioned at the corner of the frame 60 is preferably provided with a plurality of attachment convex portions 65. Each of the attachment convex portions 65 is engaged with an engagement hole formed on the frame attachment portions 94 of the front spring 90, and the front spring 90 is thereby positioned to the frame 60.

The front spring 90 has meandering portions 95. The meandering portion 95 connects the frame attachment portion 94 and the holder attachment portion 93. When the meandering portions 95 of the front spring 90 are deformed elastically, the lens holder 40 fixed with the holder attachment portions 93 can move toward the frame 60 in the light axis direction.

Each of the suspension wires 16a to 16d and the front spring 90 is constituted by a conductive material, such as a metal, and is electrically conductive. Moreover, the suspension wires 16a and 16c are electrically connected with wirings 26 of the circuit board 20, and the front spring 90 is electrically connected with the focus coil 46 fixed to the lens holder 40. Thus, electricity is supplied to the focus coil 46 via the circuit board 20, the suspension wires 16a and 16c, and the front spring 90.

The frame 60 has a rectangular ring shape capable of containing the lens holder 40. The frame 60 itself is constituted by an insulation material, such as plastic. Magnet attachment concave portions 66 are formed along four sides of the frame 60 on the rear side in the Z-axis direction. The two-way magnet 80 is fixed to the magnet attachment concave portions 66.

The two-way magnet 80 produces a magnetic field around the focus coil 46 fixed to the lens holder 40 and functions as a magnet for focusing, and also produces a magnetic field around the FP coil 30 of the fixed portion 3b and functions as a magnet for blur correction. In addition, the two-way magnet 80 produces a magnetic field around the position sensors 18a and 18b and functions as a magnet for position detection.

The two-way magnet 80 consists of four drive magnets of two first drive magnets 80a and two second drive magnets 80b. Each of the four drive magnets is arranged on the sides of the frame 60. That is, a pair of the first drive magnets 80a, whose long sides are parallel to the Y-axis, is fixed along a pair of sides parallel to the Y-axis of the four sides of the frame 60, and a pair of the second drive magnets 80b, whose long sides are parallel to the X-axis, is fixed along a pair of sides parallel to the X-axis of the four sides of the frame 60. As shown in FIG. 2 and FIG. 3, the two-way magnet 80 is arranged to surround the lens holder 40, and as understood from FIG. 6 of a cross sectional view, is arranged at a position that does not overlap with the lens 100 held by the lens holder 40 when viewed from the light axis direction.

The rear spring 50 is constituted by a plate spring continuing in the circumferential direction and has holder attachment portions 54 with a ring shape. The holder attachment portions 54 are fixed to plate spring attachment portions 44 arranged in a back surface 45 of the lens holder 40. The rear spring 50 is fixed to the plate spring attachment portions 44 by any means, such as engagement and adhesive.

The rear spring 50 has four frame attachment portions 52. The frame attachment portions 52 are arranged at the four corners of the rear spring 50 on the outer circumferential side of the holder attachment portions 54. The holder attachment portion 54 and the frame attachment portion 52 are connected by a meandering portion 55 corresponding with each of the frame attachment portions 52. Each of the frame attachment portions 52 is engaged and fixed with a corner back surface 68 of the frame 60.

When the meandering portions 55 of the rear spring 50 are elastically deformed in a similar manner to the meandering portions 95 of the front spring 90, the lens holder 40 fixed with the holder attachment portions 54 can move toward the frame 60 in the light axis direction. Unlike the front spring 90, however, the rear spring 50 does not need to function as an electrically conductive passage.

Figure 6:
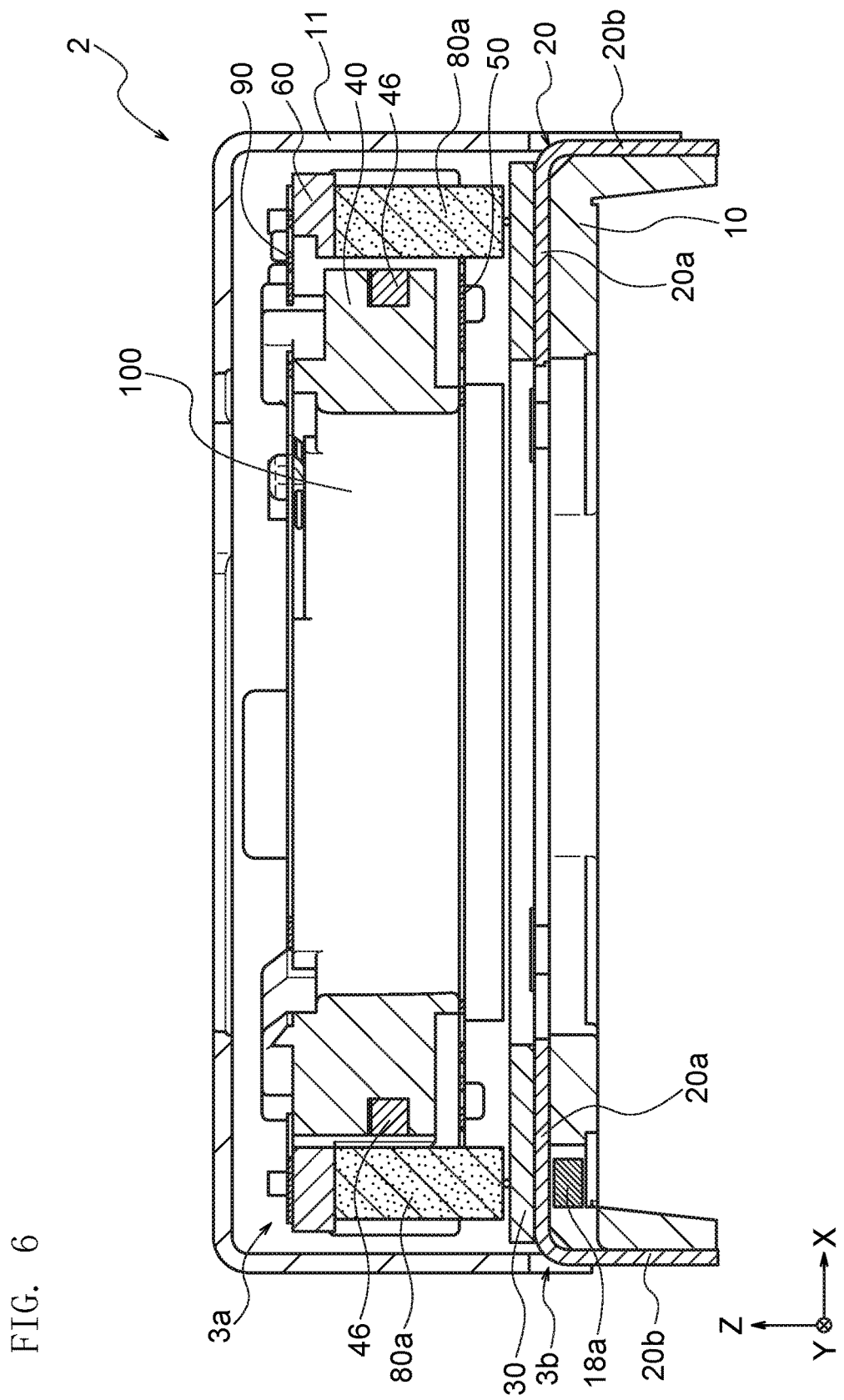
FIG. 6 is a cross sectional view of the lens drive device shown in FIG. 1.

FIG. 6 is a cross section of the lens drive device 2. As shown in FIG. 6, the first drive magnets 80a and the second drive magnets 80b fixed to the frame 60 and constituting the two-way magnet 80 are opposed to the focus coil 46 fixed to the outer circumferential surface of the lens holder 40 with a slight space. The first and second drive magnets 80a and 80b generate a magnetic field around the focus coil 46 adjacent to their inner side. The lens drive device 2 adjusts a direction and an amount of an electric current flowing through the focus coil 46 and controls a force to the focus coil 46 generated by its near magnetic field, and the lens 100 fixed to the lens holder 40 can thereby move along the light axis direction. Incidentally, as described below, the first and second drive magnets 80a and 80b constituting the two-way magnet has an AF drive region opposed to the focus coil 46 and a blur correction drive region opposed to first or second drive coils 30a or 30b.

Figure 5:
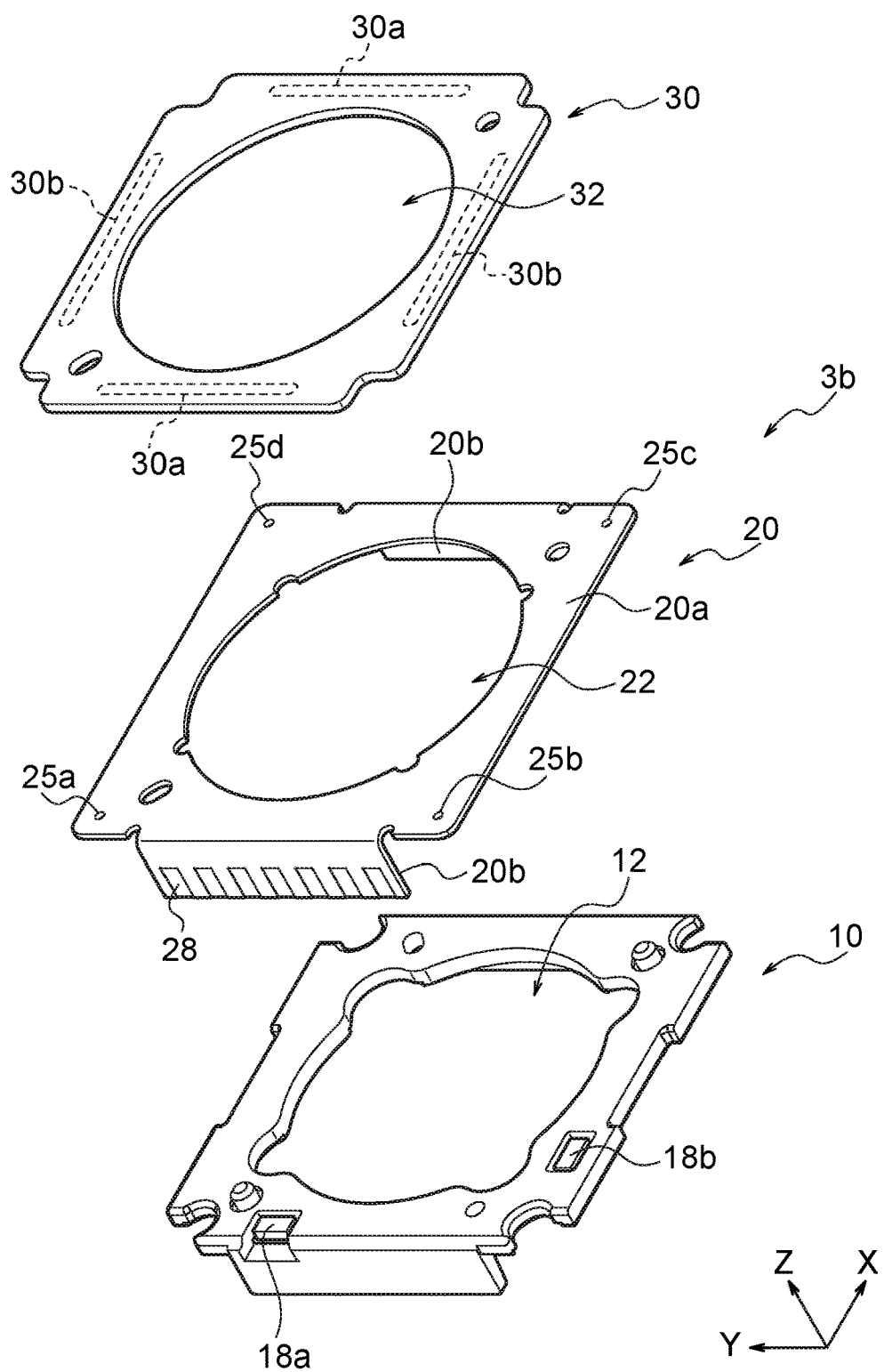
FIG. 5 is a disassembled perspective view of parts constituting the fixed portion shown in FIG. 3.

FIG. 5 is a disassembled perspective view of the fixed portion 3b shown in FIG. 3. The fixed portion 3b has the FP coil 30, the circuit board 20, the base portion 10, and the position sensors 18a and 18b. The FP coil 30 has a rectangular plate shape whose central area is provided with a FP coil opening 32 of a circular through hole. The surface of the FP coil 30 is covered with an insulator composed of a resin. The insulator covering the surface of the FP coil 30 contains the first and second drive coils 30a and 30b, where a conductor foil is formed into a coil shape.

The FP coil 30 has four drive coils 30a and 30b consisting of the two first drive coils 30a and the two second drive coils 30b. Each of the four drive coils 30a and 30b is arranged along respective sides of a board plane portion 20a of the circuit board 20 below by surrounding outer circumferences of the FP coil opening 32 and a board opening 22 of the circuit board 20 when viewed from the light axis.

That is, a pair of the first drive coils 30a, which have long sides parallel to the Y-axis, is arranged along a pair of sides parallel to the Y-axis of the four sides of the board plane portion 20a with a rectangular outer circumference, and a pair of the second coils 30b, which have long sides parallel to the X-axis, is arranged along a pair of sides parallel to the X-axis of the four sides of the board plane portion 20a.

As shown in FIG. 3, each of the drive coils 30a and 30b owned by the FP coil 30 is arranged to oppose against the first and second drive magnets 80a and 80b fixed to the frame 60 in the light axis direction. The first drive coils 30a are arranged to oppose against the first drive magnets 80a, and the second drive coils 30b are arranged to oppose against the second drive magnets 80b. The first drive coils 30a and the first drive magnets 80a constitute a drive portion for blur correction where the movable portion 3a is moved toward a direction of the first drive axis (X-axis), and the second drive coils 30b and the second drive magnets 80b constitute a drive portion for blur correction where the movable portion 3a is moved toward a direction of the second drive axis (Y-axis).

Each of the drive coils 30a and 30b owned by the FP coil 30 is electrically connected with the wirings 26 of the circuit board 20 arranged behind and is supplied with electricity via the wirings 26 of the circuit board 20. Incidentally, in the present embodiment, the drive coils 30a and 30b are constituted by the FP coil 30, but are not limited thereto and may be a coil formed by winding a coated wire.

The board opening portion 22, which goes through front and back surfaces, is formed in the central area of the circuit board 20. The circuit board 20 has the board plane portion 20a extending along a vertical direction to the light axis and two folded portions 20b connected with both ends of the board plane portion 20a in the X-axis direction and extending along the light axis. The circuit board 20 is constituted by a flexible print board. In the circuit board 20, the insulator composed of a resin contains a plurality of the wirings 26 of conductive foils (see FIG. 9). Incidentally, the circuit board 20 is described in detail below.

A base opening 12 is formed in the central area of the base portion 10. The base portion 10 has a similar outer shape to the circuit board 20 and is constituted by a resin molded body or so. The circuit board 20 constituted by a flexible print board is attached from the positive side of the Z-axis direction to the base portion 10 and is thereby supported by the base portion 10 from behind.

A through hole is formed at two points of the base portion 10 so that the position sensors 18a and 18b can be attached to the circuit board 20. The position sensors 18a and 18b are fixed to the rear surface of the board plane portion 20a of the circuit board 20 (the surface facing the negative side of the Z-axis direction) and are contained in the through holes of the base portion 10. The position sensor 18a is arranged adjacent to either of sides parallel to the Y-axis of four sides constituting the rectangular outer circumferential portion of the board plane portion 20a. The position sensor 18b is arranged adjacent to either of sides parallel to the X-axis of the four sides of the board plane portion 20a.

Figure 7:
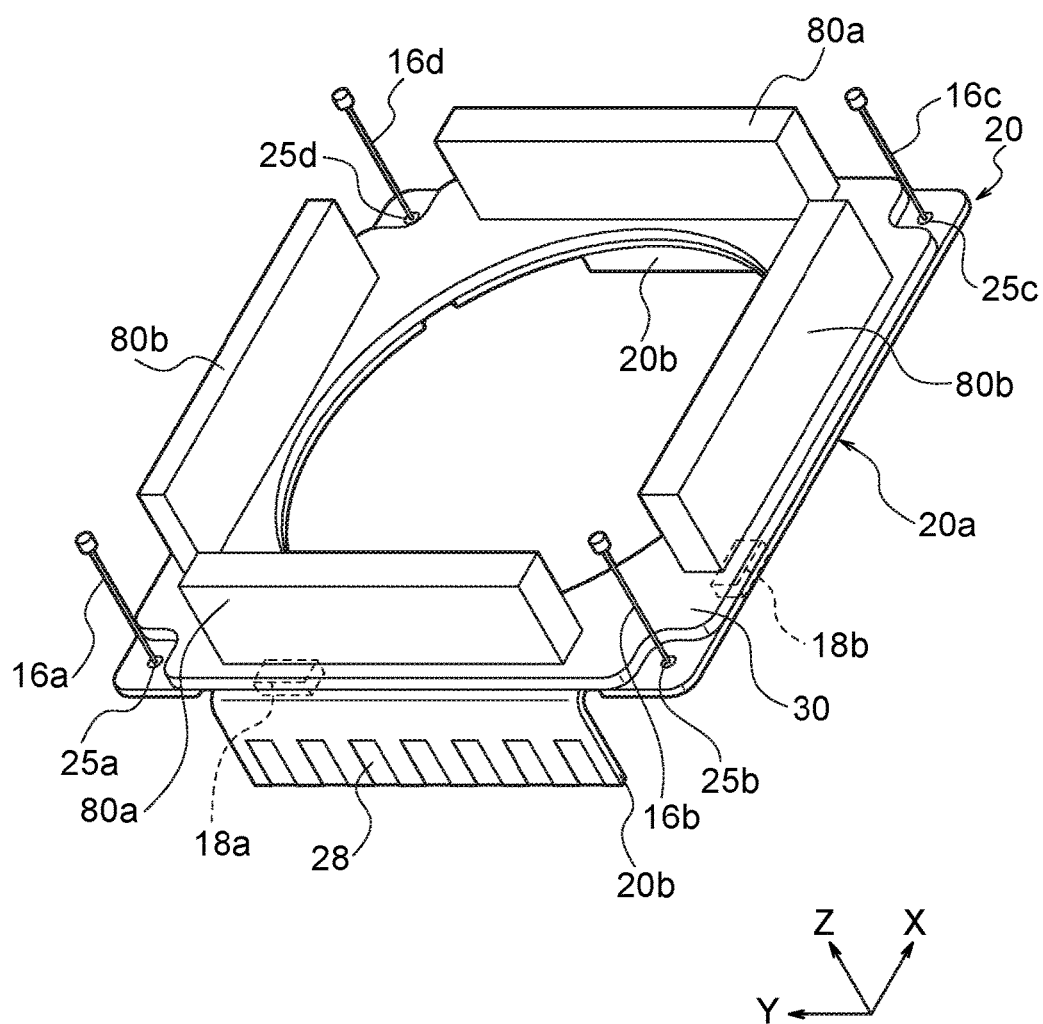
FIG. 7 is a perspective view showing an arrangement of suspension wires, magnets, a FP coil, a circuit board, and position sensors of the lens drive device.

The position sensors 18a and 18b are arranged to oppose against the drive magnets 80a and 80b fixed to the frame 60 in the light axis direction. As shown in FIG. 7, the position sensor 18a is arranged to oppose against the first drive magnet 80a, and the position sensor 18b is arranged to oppose against the second drive magnet 80b. The position sensor 18a detects a position of the movable portion 3a with respect to the direction of the first drive axis (X-axis), and the position sensor 18b detects a position of the movable portion 3a with respect to the direction of the second drive axis (Y-axis).

The position sensor 18b is electrically connected with the wirings 26 of the circuit board 20, and each of the position sensors 18a and 18b is supplied with electricity via the wirings 26 of the circuit board 20. Detection signals of the position sensors 18a and 18b are also transmitted via the wirings 26 of the circuit board 20.

As shown in FIG. 2 and FIG. 3, the movable portion 3a is supported by the four suspension wires 16a, 16b, 16c, and 16d with respect to the fixed portion 3b. FIG. 7 is a perspective view showing an arrangement of the suspension wires 16a to 16d, the first and second drive magnets 80a and 80b, the FP coil 30, the circuit board 20, and the position sensors 18a and 18b. Rear ends of the suspension wires 16a to 16d are connected with the circuit board 20 at four wire connection positions 25a to 25d positioned at the four corners of the circuit board 20.

On the other hand, as shown in FIG. 3, front ends of the suspension wires 16a to 16d are connected with the wire attachment portions 92a to 92d positioned at the four corners of the front spring 90. In this way, the suspension wires 16a to 16d are arranged at approximately equal intervals around the lens 100 held by the lens holder 40 when viewed from the light axis direction, and each of the suspension wires 16a to 16d connects the movable portion 3a and the fixed portion 3b in the light axis direction.

The four suspension wires 16a to 16d have a similar length and supports the movable portion 3a in an approximately parallel state to the fixed portion 3b. When the four suspension wires 16a to 16d are deformed elastically in a cooperative manner, the movable portion 3a can relatively move to the fixed portion 3b along a drive plane perpendicular to the light axis. As shown in FIG. 2 and FIG. 3, the movable portion 3a moves relatively to the fixed portion 3b connected by the suspension wires 16a to 16d toward directions vertical to the light axis direction by an electromagnetic force generated in the drive magnets 80a and 80b and the drive coils 30a and 30b.

Figure 8:
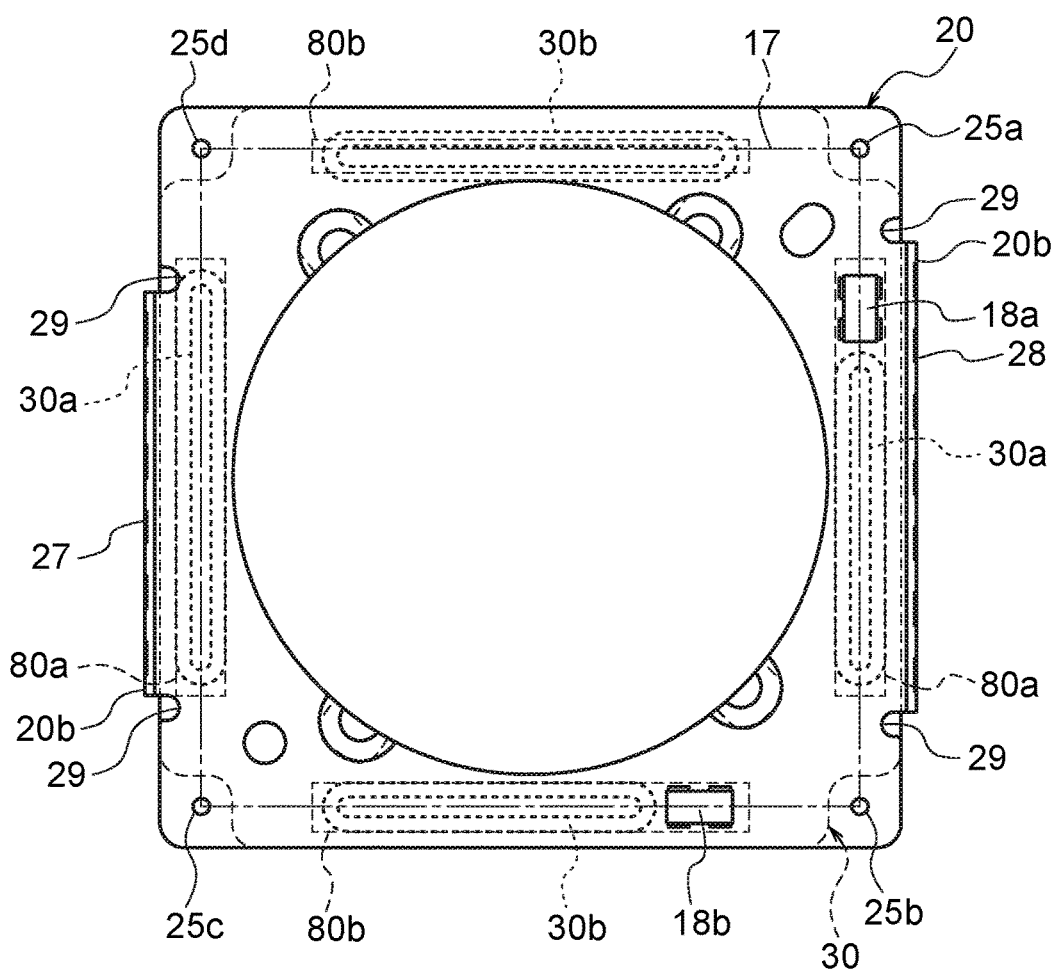
FIG. 8 is a plane view showing the magnets, the FP coil, the circuit board, and the position sensors shown in FIG. 7 from a light axis direction.
Figure 8:
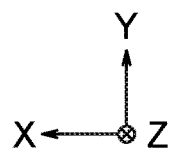

FIG. 8 is a plane view where the first and second drive magnets 80a and 80b, the FP coil 30, the circuit board 20, and the position sensors 18a and 18b shown in FIG. 7 are viewed from behind in the light axis direction (negative side of the Z-axis direction). Incidentally, in FIG. 8, the first and second drive magnets 80a and 80b and the first and second drive coils 30a and 30b positioned on the rear side of the circuit board 20 are expressed by dotted lines for recognition of their positions. FIG. 8 fails to show the base portion 10 arranged behind the circuit board 20.

As shown in FIG. 8, the position sensors 18a and 18b and the first and second drive coils 30a and 30b are arranged so that the four suspension wires 16a to 16d are overlapped with four sides of a four-sided polygon 17 formed by connecting the wire connection positions 25a to 25d at the four points connected with the circuit board 20 (included in the fixed portion 3b) when viewed from the light axis direction. That is, the position sensor 18a and the first drive coil 30a are arranged to overlap with a side connecting between the wire connection position 25a and the wire connection position 25b when viewed from the light axis direction. The position sensor 18b and the second drive coil 30b are arranged to overlap with a side connecting between the wire connection position 25b and the wire connection position 25c when viewed from the light axis direction. Incidentally, the side where the position sensor 18a and the first drive coil 30a are overlapped and the side where the position sensor 18b and the second drive coil 30b are overlapped are sides adjacent to each other.

If the position sensors 18a and 18b and the first and second drive coils 30a and 30b are arranged by being shifted from the four sides of the four-sided polygon 17 formed by connecting the wire connection positions 25a to 25d toward the center of the light axis, it becomes difficult to enlarge the board opening portion 22 of the circuit board 20 and thereby becomes difficult to increase a diameter of the lens 100 mounted on the lens drive device 2.

If the position sensors 18a and 18b and the first and second drive coils 30a and 30b are arranged by being shifted from the four sides of the four-sided polygon 17 formed by connecting the wire connection positions 25a to 25d toward the outer diameter side, a detection accuracy of the position sensors 18a and 18b is easily adversely affected by an inclination or so of the movable portion 3a due to non-ideal deformation of the suspension wires 16a to 16d, and the position sensors 18a and 18b may have a deteriorated detection accuracy.

On the other hand, if the position sensors 18a and 18b and the first and second drive coils 30a and 30b are arranged to overlap with the four sides of the four-sided polygon 17 formed by connecting the wire connection positions 25a to 25d, it becomes possible to prevent a problem of deterioration of detection accuracy of the position sensors 18a and 18b while a region for the board opening portion 22 can be maintained widely.

The position sensor 18a is arranged between the wire connection position 25a, which is the closest to the position sensor 18a, and the drive coil 30a closer to the position sensor 18a when viewed from the light axis direction, and neither the drive coil 30a nor the drive coil 30b is arranged between the position sensor 18a and the wire connection position 25a. In such an arrangement, the first drive coil 30a arranged next to the position sensor 18a does not need to be divided, and it thereby becomes possible to efficiently arrange the first drive coil 30a having a necessary drive force in a small region.

If a single first drive coil 30a is divided into two first drive coils and the position sensor 18a is arranged by being sandwiched these two first drive coils, the position sensor 18a needs to be arranged in an extremely small region as a plane sandwiched by an opening edge of the board opening portion 22 and a boundary between the board plane portion 20a and the folded portion 20b. In this case, the position sensor 18 is easily affected by a deformation stress or so of the circuit board 20 constituted by a flexible print board, and may have a deteriorated position detection accuracy.

On the other hand, when the position sensor 18a is arranged between the wire connection position 25a and the drive coil 30a, the position sensor 18a is arranged in a region where a distance from the opening edge of the board opening portion 22 to the boundary between the board plane portion 20a and the folded portion 20b is larger than that of the middle position of the boundary. In such an arrangement, the position sensor 18a is hard to be affected by a deformation stress or so of the circuit board 20 constituted by a flexible print board, and can be prevented from having a deteriorated position detection accuracy.

Incidentally, as shown in FIG. 8, the position sensor 18a and the first drive coil 30a closer thereto are preferably not overlapped with each other when viewed from the light axis direction. This can prevent detection values of the position sensor 18a from being affected by an electric current flowing through the first drive coil 30a. In the lens drive device 2, however, since the FP coil 30 is arranged on the front surface of the circuit board 20 and the position sensor 18a is arranged on the back surface of the circuit board 20, as shown in FIG. 6, the position sensor 18a and the first drive coil 30a closer thereto can be also arranged to be overlapped when viewed from the light axis direction. Even in such a case, it is still preferred that at least a sensing part of the position sensor 18a be arranged to avoid overlapping with the first drive coil 30a when viewed from the light axis direction.

Likewise, the position sensor 18b and the second drive coil 30b closer thereto are preferably arranged at a position that does not overlap with each other when viewed from the light axis direction.

Figure 9:
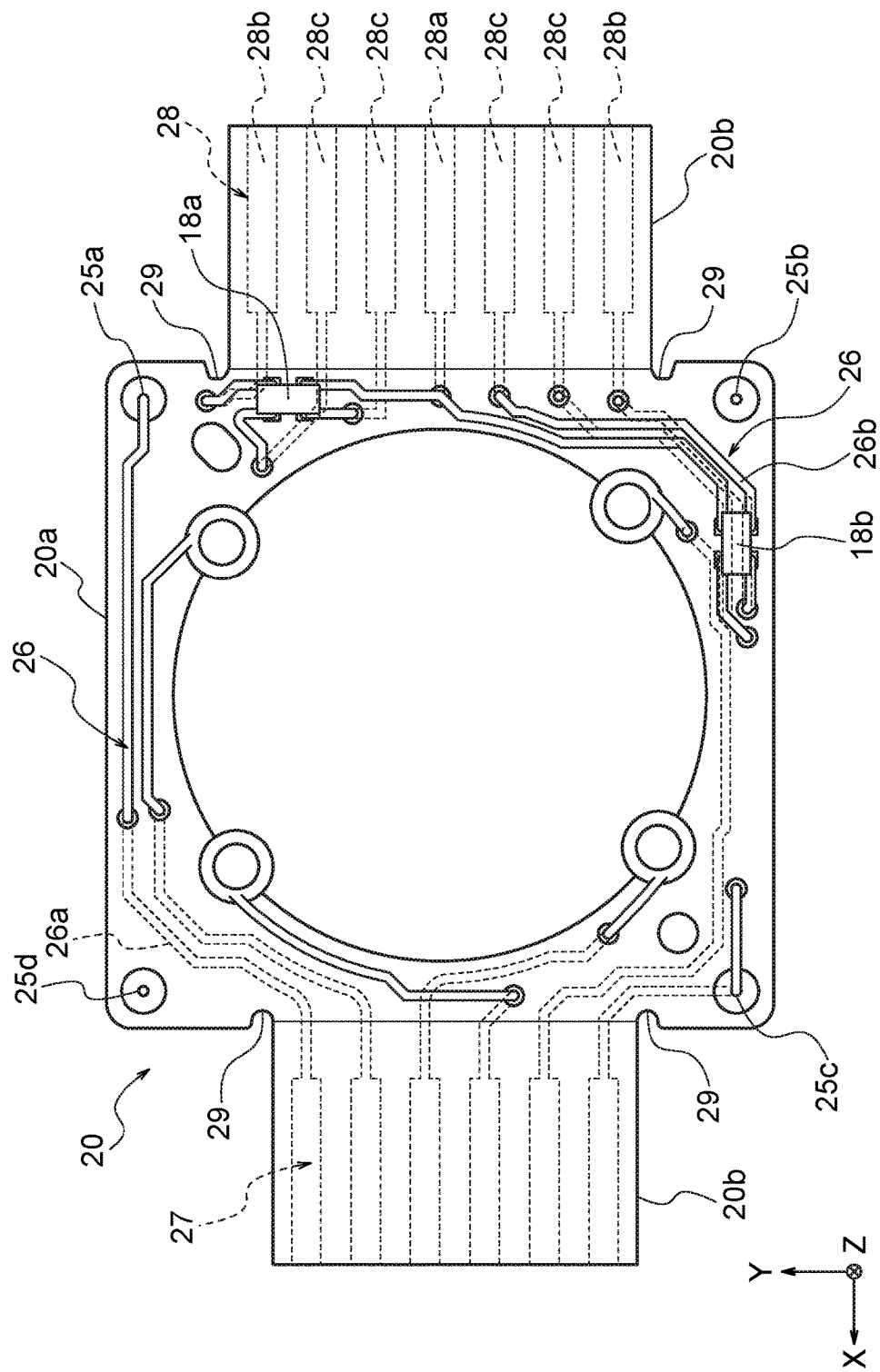
FIG. 9 is a conceptual view showing a wiring of the circuit board and the position sensors shown in FIG. 7.

FIG. 9 is a conceptual view showing an outer shape of the circuit board 20 of a flexible print board and the wirings 26 owned by the circuit board 20. In the circuit board 20 shown in FIG. 9, the board plane portion 20a and the folded portions 20b are illustrated on the same plane for convenience of description. In the circuit board 20, the folded portions 20b positioned on both ends in the X-axis direction are actually fixed to the base portion 10 by being folded toward the negative side of the Z-axis direction at 90 degrees with respect to the board plane portion 20a positioned at the middle part in the X-axis direction.

As shown in FIG. 8, the two folded portions 20b are connected with the board plane portion 20a at a position that is more distant from the center position in the light axis direction than the four sides of the four-sided polygon 17 formed by connecting the wire connection positions 25a to 25d (outer diameter side of the four sides), and extend along the light axis direction. One of the folded portions 20b is arranged adjacent to a side connecting the wire connection position 25d and the wire connection position 25c when viewed from the light axis direction, and a coil leading terminal portion 27 is arranged at one of the folded portions 20b. The other folded portion 20b is arranged adjacent to a side connecting the wire connection position 25a and the wire connection position 25b when viewed from the light axis direction, and a sensor leading terminal portion 28 is arranged at the other folded portion 20b.

Since the circuit board 20 has the folded portions 20b, the lens drive device 2 can decrease a projected area from the light axis, and is thereby advantageous in terms of downsizing. The position sensors 18a and 18b are fixed to the board plane portion 20a and can be thereby arranged close to the first or second drive magnet 80a or 80b, and such a structure thus contributes to downsizing and improvement in position detection accuracy.

As shown in FIG. 8 and FIG. 9, notches 29 are formed on both ends of the connection portions with the folded portions 20b (both ends in the X-axis direction) at the rectangular outer circumference of the board plane portion 20a. Since the notches 29 are formed, a stress due to folding the flexible print board can be prevented from traveling through the surroundings of the connection portions between the board plane portion 20a and the folded portions 20b, and it is thus possible to prevent deformation of the board plane portion 20a and improve an arrangement accuracy of the position sensors 18a and 18b fixed to the board plane portion 20a. Since the notches 29 are formed, it is also possible to prevent remaining of a stress due to folding the flexible print board and deformation after assembling due to the remaining stress and enhance a detection accuracy of the position sensors fixed to the board plane portion 20a.

As shown in FIG. 9, the circuit board 20 has wiring layers whose structure has two layers overlapped in the Z-axis direction. In FIG. 9, wiring layers on the negative side of the Z-axis direction (front side in FIG. 9) are represented by solid lines, and wiring layers on the positive side of the Z-axis direction (back side in FIG. 9) are represented by dotted lines.

As shown in FIG. 9 and FIG. 7, the circuit board 20 has two leading terminal portions consisting of the coil leading terminal portion 27 and the sensor leading terminal portion 28. As shown in FIG. 8 and FIG. 9, the coil leading terminal portion 27 has a plurality of leading terminals arranged along one of the four sides of the four-sided polygon 17 formed by connecting the wire connection portions 25a to 25d. As shown in FIG. 9, the leading terminals of the coil leading terminal portion 27 are electrically connected with a coil wiring 26a of a plurality of the wirings 26 owned by the circuit board 20 for supplying electricity to the first drive coils 30a, the second drive coils 30b, and the focus coil 46 (see FIG. 3).

The coil leading terminal portion 27 has six leading terminals in total consisting of two respective coils with respect to three kinds of coils (eight coils in total) of the first drive coils 30a, the second drive coils 30b, and the focus coil 46, but the coil leading terminal portion 27 is not limited to having such leading terminals. The coil leading terminal portion 27 is, however, not electrically connected with the position sensors 18a and 18b or a sensor wiring 26b.

On the other hand, the sensor leading terminal portion 28 has a plurality of leading terminals arranged along another one of the four sides of the four-sided polygon 17 formed by connecting the wire connection portions 25a to 25d. The sensor leading terminal portion 28 is arranged along a side connecting the wire connection portion 25a and the wire connection portion 25b. Meanwhile, the coil leading terminal portion 27 is arranged along a side opposing to the side where the sensor leading terminal portion 28 is arranged, that is, a side connecting the wire connection portion 25d and the wire connection portion 25c.

The leading terminals of the sensor leading terminal portion 28 are connected with the sensor wiring 26b of a plurality of the wirings 26 owned by the circuit board 20 for supplying electricity to the position sensors 18a and 18b and transmitting signals therefrom. The sensor leading terminal portion 28 has seven leading terminals in total consisting of three feeding leading terminals 28a and 28b for supplying electricity to the position sensors 18a and 18b (the feeding leading terminal 28a as GND is common) and two signal transmission leading terminals 28c for transmitting position detection signals of the position sensors 18a and 18b per each of the position sensors 18a and 18b, but the sensor leading terminal portion 28 is not limited to having such leading terminals.

In the sensor leading terminal portion 28, as shown in FIG. 9, the signal transmission leading terminals 28c for transmitting position detection signals of the position sensor 18a are arranged to be sandwiched by a pair of the feeding leading terminals 28a and 28b on both sides in the arrangement direction (both sides in the Y-axis direction). As is the case with the signal transmission leading terminals 28c for transmitting position detection signals of the position sensor 18a, the signal transmission leading terminals 28c for transmitting position detection signals of the position sensor 18b are also arranged to be sandwiched by a pair of the feeding leading terminals 28a and 28b on both sides in the arrangement direction (both sides in the Y-axis direction).

When the signal transmission leading terminals 28c are arranged between the feeding leading terminals 28a and 28b, position detection signals transmitted via the signal transmission leading terminals 28c are protected from a peripheral electromagnetic field by the feeding leading terminals 28a and 28b. In such a circuit board 20, it is thus possible to effectively prevent noise contained in position detection signals of the position sensors 18a and 18b from increasing due to influence of an electromagnetic field or so formed in the periphery of the circuit board 20.

In the circuit board 20, the coil leading terminal portion 27 electrically connected with the coil wiring 26a and the sensor leading terminal portion 28 electrically connected with the sensor wiring 26b are arranged separately on opposing sides of the four-sided polygon 17 formed by connecting the wire connection portions 25a to 25d. In a circuit board 20, there exist a small number of parts where the coil wiring 26a and the sensor wiring 26b are close to each other, and it is thus possible to effectively prevent noise contained in position detection signals transmitted via the sensor wiring 26b from increasing due to influence of an electric current flowing through the coil wiring 26a. In the lens drive device 2 having such a circuit board 20, it is thus possible to reduce noise contained in position detection signals of the position sensors 18a and 18b and precisely control a position of the lens 100.

The present invention is accordingly described based on an embodiment, but is not limited to only the lens drive device 2 shown in the above-mentioned embodiment. In addition to the shapes shown in the figures or so, the present invention has a large number of variations with respect to shapes of a lens holder, a circuit board, a frame, and the like contained in the lens drive device 2.

For example, FIG. 10A and FIG. 10B are a schematic view showing an arrangement relation between the circuit board 20 and the position sensor 18a in the embodiment and variations. In the lens drive device 2 according to the embodiment, as shown in FIG. 10A, the FP coil 30 is arranged on the front surface of the circuit board 20, and the position sensor 18a is arranged on the back surface of the circuit board 20. However, the position sensor 18a is not limited to being arranged in this manner, and as shown in FIG. 10B, the position sensor 18a may be arranged on the front surface of the circuit board 20 (positive side of the Z-axis direction) in the same manner as the FP coil 30.

NUMERICAL REFERENCES

2 . . . lens drive device
3a . . . movable portion
3b . . . fixed portion
10 . . . base portion
11 . . . case
12 . . . base opening
16a to 16d . . . suspension wire
17 . . . four-sided polygon
18a, 18b . . . position sensor
20 . . . circuit board
20a . . . board plane portion
20b . . . board folded portion
22 . . . board opening portion
25a to 25d . . . wire connection portion
26 . . . wiring
26a . . . coil wiring
26b . . . sensor wiring
27 . . . coil leading terminal portion
28 . . . sensor leading terminal portion
28a . . . feeding leading terminal (GND)
28b . . . feeding leading terminal
28c . . . signal transmission leading terminal
29 . . . notch
30 . . . FP coil
30a . . . first drive coil
30b . . . second drive coil
32 . . . FP coil opening
40 . . . lens holder
42 . . . front surface
44 . . . plate spring attachment portion
45 . . . back surface
46 . . . focus coil
47 . . . outer circumferential surface
48 . . . inner circumferential surface
50 . . . rear spring
52 . . . frame attachment portion
54 . . . holder attachment portion
55 . . . meandering portion
60 . . . frame
64 . . . front surface
65 . . . attachment convex portion
66 . . . magnet attachment concave portion
68 . . . corner back surface
80 . . . two-way magnet
80a . . . first drive magnet 80b . . . second drive magnet
90 . . . front spring
93 . . . holder attachment portion
94 . . . frame attachment portion
95 . . . meandering portion
100 . . . lens

The invention claimed is:

1. A lens drive device comprising:

a movable portion having a lens holder holding a lens and a magnet arranged at a position that does not overlap with the lens when viewed from a light axis direction;

a fixed portion having a coil and a position sensor arranged to oppose against the magnet in the light axis direction and a circuit board having a plurality of wirings configured to supply electricity to the coil and the position sensor and transmit a signal from the position sensor; and four suspension wires arranged around the lens at approximately equal intervals when viewed from the light axis direction and configured to support the movable portion against the fixed portion so that the movable portion can move relatively to the fixed portion in a vertical direction to the light axis direction by an electromagnetic force generated in the magnet and the coil, wherein the position sensor and the coil are arranged to overlap with four sides of a four-sided polygon formed by connecting four wire connection positions where the four suspension wires are connected with the fixed portion when viewed from the light axis direction, wherein the position sensor is arranged between the wire connection position closest to the position sensor and the coil closest to the position sensor, and wherein the circuit board comprises:

a coil leading terminal portion provided with a plurality of leading terminals along one of the four sides of the four-sided polygon formed by connecting the wire connection positions and electrically connected with a coil wiring of the plurality of wirings for supplying electricity to the coil; and a sensor leading terminal portion provided with a plurality of leading terminals along another one of the four sides of the four-sided polygon formed by connecting the wire connection positions and electrically connected with a sensor wiring of the plurality of wirings for supplying electricity to the position sensor and transmitting a signal therefrom.

2. The lens drive device according to claim 1, wherein the circuit board comprises:

a board plane portion extending along the vertical direction to the light axis direction; and a board folded portion connected with the board plane portion at a position that is more distant from a center position of the light axis direction than the four sides of the four-sided polygon formed by connecting the wire connection positions and extending along the light axis direction, the position sensor is fixed to the board plane portion, and the sensor leading terminal portion is arranged on the board folded portion.

3. The lens drive device according to claim 2, wherein the circuit board is a flexible print board, and a notch is formed on both ends of a connection portion with the board folded portion in an outer circumferential portion of the board plane portion.

4. The lens drive device according to claim 1, wherein the sensor leading terminal portion comprises:

a pair of feeding leading terminals configured to supply electricity to the position sensor; and a signal transmission leading terminal arranged to be sandwiched by the pair of feeding leading terminals and configured to transmit a signal of the position sensor.

5. The lens drive device according to claim 2, wherein the sensor leading terminal portion comprises:

a pair of feeding leading terminals configured to supply electricity to the position sensor; and a signal transmission leading terminal arranged to be sandwiched by the pair of feeding leading terminals and configured to transmit a signal of the position sensor.

6. The lens drive device according to claim 3, wherein the sensor leading terminal portion comprises:

a pair of feeding leading terminals configured to supply electricity to the position sensor; and a signal transmission leading terminal arranged to be sandwiched by the pair of feeding leading terminals and configured to transmit a signal of the position sensor.

\* \* \* \* \*